United States Patent
Srinivasa et al.

(10) Patent No.: US 11,594,258 B2
(45) Date of Patent: Feb. 28, 2023

(54) SYSTEM FOR THE AUTOMATED, CONTEXT SENSITIVE, AND NON-INTRUSIVE INSERTION OF CONSUMER-ADAPTIVE CONTENT IN VIDEO

(71) Applicant: PES University, Bengaluru (IN)

(72) Inventors: Gowri Srinivasa, Bengaluru (IN); Atmik Ajoy, Bengaluru (IN); Dhanya Gowrish, Bangalore (IN); Chethan U Mahindrakar, Bangalore (IN)

(73) Assignee: PES UNIVERSITY, Bengaluru (IN)

( * ) Notice: Subject to any disclaimer, the term of this patent is extended or adjusted under 35 U.S.C. 154(b) by 0 days.

(21) Appl. No.: 17/483,768

(22) Filed: Sep. 23, 2021

(65) Prior Publication Data
US 2023/0017614 A1    Jan. 19, 2023

(30) Foreign Application Priority Data
Jul. 19, 2021    (IN) .............................. 202141032385

(51) Int. Cl.
*G11B 27/036*    (2006.01)
*H04N 21/44*    (2011.01)
(Continued)

(52) U.S. Cl.
CPC .......... *G11B 27/036* (2013.01); *G06K 7/1413* (2013.01); *G06K 7/1417* (2013.01);
(Continued)

(58) Field of Classification Search
CPC .. G11B 27/036; G06K 7/1413; G06K 7/1417; G06Q 30/0255; G06V 20/42;
(Continued)

(56) References Cited

U.S. PATENT DOCUMENTS 7,039,599 B2    5/2006    Merriman
8,369,686 B2    2/2013    Mei
(Continued)

FOREIGN PATENT DOCUMENTS

EP    0372738 A1    6/1990
WO    WO2020/056027 A1    3/2020

*Primary Examiner* — Helen Shibru
(74) *Attorney, Agent, or Firm* — Yantra Patents LLC; Anand P Narayan (57) ABSTRACT

Described herein is a method and system for automated, context sensitive and non-intrusive insertion of consumer-adaptive content in video. It assesses 'context' in the video that a consumer is viewing through multiple modalities and metadata about the video. The method and system described herein analyzes relevance for a consumer based on multiple factors such as the profile information of the end-user, history of the content, social media and consumer interests and professional or educational background, through patterns from multiple sources. The system also implements local-context through search techniques for localizing sufficiently large, homogenous regions in the image that do not obfuscate protagonists or objects in focus but are viable candidate regions for insertion for the intended content. This makes relevant, curated content available to a user in the most effortless manner without hampering the viewing experience of the main video.

15 Claims, 6 Drawing Sheets

(51) Int. Cl.
*H04N 21/439* (2011.01)
*H04N 21/81* (2011.01)
*G06Q 30/02* (2012.01)
*G06K 7/14* (2006.01)
*H04N 21/458* (2011.01)
*G06V 20/40* (2022.01)
*G06Q 30/0251* (2023.01)
*G09B 5/06* (2006.01)
*G10L 15/26* (2006.01)

(52) U.S. Cl.
CPC ......... *G06Q 30/0255* (2013.01); *G06V 20/42* (2022.01); *G06V 20/43* (2022.01); *G06V 20/46* (2022.01); *G06V 20/49* (2022.01); *H04N 21/4394* (2013.01); *H04N 21/44008* (2013.01); *H04N 21/458* (2013.01); *H04N 21/812* (2013.01); *G09B 5/065* (2013.01); *G10L 15/26* (2013.01)

(58) Field of Classification Search
CPC ........ G06V 20/43; G06V 20/46; G06V 20/49; H04N 21/4394; H04N 21/44008; H04N 21/458; H04N 21/812; G09B 5/065; G10L 15/26

USPC ........................................................ 386/285
See application file for complete search history.

(56) References Cited

U.S. PATENT DOCUMENTS

| | | | |
|---|---|---|---|
| 8,745,657 | B2 | 6/2014 | Chalozin et al. |
| 8,782,690 | B2 | 7/2014 | Briggs et al. |
| 8,910,201 | B1 | 12/2014 | Zamiska et al. |
| 8,949,889 | B1 | 2/2015 | Erdmann |
| 9,467,750 | B2 | 10/2016 | Banica |
| 9,497,491 | B2 * | 11/2016 | Zalewski ............... H04N 5/147 |
| 10,671,853 | B2 | 6/2020 | Harris |
| 10,839,573 | B2 | 11/2020 | Marino |
| 10,869,158 | B2 * | 12/2020 | Chipouras ........... G06F 16/2379 |
| 2008/0126226 | A1 | 5/2008 | Popkiewicz et al. |
| 2016/0050465 | A1 * | 2/2016 | Zaheer ................ H04N 21/6125 725/34 |
| 2019/0174191 | A1 | 6/2019 | Abbas et al. |
| 2022/0038761 | A1 * | 2/2022 | Majumdar ......... H04N 21/4756 |
| 2022/0101011 | A1 * | 3/2022 | Dela Rosa ............. G06V 20/48 |

* cited by examiner

SYSTEM FOR THE AUTOMATED, CONTEXT SENSITIVE, AND NON-INTRUSIVE INSERTION OF CONSUMER-ADAPTIVE CONTENT IN VIDEO

BACKGROUND OF INVENTION

This invention in general relates to digital content and specifically relates to a system and computer implemented method of content insertion in videos.

Current technology, such as streaming video or video hosting and sharing platforms incorporate video advertisements that interrupt the program a user is viewing to advertise a product. These video ads are intrusive to the viewing experience and counter-productive for everyone involved: the consumer is unhappy about the interruption and may look for an alternative platform or subscription to avoid ads, the video hosting and sharing platform runs the risk of losing its customers and the companies sponsoring the ads may not be reaching the right audience or run the risk of the ad being skipped before the intended message reaching a potential customer.

In case of news clips, relevant or related news video is made available as recommendations outside the frame; banners with moving text of headlines or snippets of news may be useful for a viewer but requires a consumer to manually search for and select a relevant clip to play. Providing hyperlinks to relevant content or recommendations to related news (for instance, related clips of an unfolding story or other points of view with regard to a debate, etc.) would be of great relevance and provide a way to engage with a user.

In case of sports video, presently, a connoisseur of the sport or someone seeking to study a specific technique or a particular player will often have to explicitly search for clips and wade through a lot of unnecessary content to manually zoom into the technique or player, etc., of interest.

In case of educational video, additional notes may be provided with the video or even annotations with the video to search for content, but if a student wants to look up a concept being discussed or backlink to relevant clips of pre-requisite material, they would have to explicitly look for this. In case of online learning, a student may want to answer a few questions to check how well they have understood a concept or solve a few numericals before further layers of detail are added to a concept. At present, a student may have to pause the video and look for relevant content and then resume playing the video.

SUMMARY OF INVENTION

Techniques of this disclosure seek to mitigate the above mentioned unmet needs by introducing content in the form of one or more of the following: images or logos or a banner or a QR code or bar code, or a hyperlink to more information or even product placement through a strategic insertion into existing video. The insertion is done in a manner that is noticeable by the viewer, yet non-intrusive to the viewing experience. It assesses 'context' in the video that a consumer is viewing through multiple modalities and metadata about the video, in terms of the messaging through an analysis of the plot or subject or details of a game (venue, date, tournament etc.), audio track and the 'actors' (that could refer to professional actors or professors, team players, news anchor, etc.) involved. The method and system described herein analyzes 'relevance' for a consumer based on multiple factors such as the profile information of the end-user, history of the content, social media and consumer interests and professional or educational background, through user feedback and mining patterns from multiple sources. The system also implements local-context through search techniques for localizing sufficiently large, homogenous regions in the image that do not obfuscate protagonists or objects in focus but are viable candidate regions for insertion for the intended content. This makes relevant, curated content available to a user in the most effortless manner without hampering the viewing experience of the main video.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computer implemented method also includes logging in said user and identifying specific professional and personal interests of the user; determining a type of said video where the video is determined to be one of a streaming or a stored video; conducting scene segmentation of the video; surfing a content repository, and shortlisting appropriate content through analysis of elements of the scene in the video, audio, and textual contents; determining top-ranked content for insertion based on what is appropriate to the user in terms of their interests; identifying locations for content insertion through further analysis of an image for visual content elements based on one or a combination of lighting, venue, action, presence of person(s) or subject(s), and presence of synthetic elements; ranking said identified locations for insertion based on suitability; inserting content into the identified location and splicing the video. The method also includes playing back the video to the user with said inserted content. Other embodiments of this aspect include corresponding computer systems, apparatus, and computer programs recorded on one or more computer storage devices, each configured to perform the actions of the methods.

Implementations may include one or more of the following features. The method where location for content insertion is determined through a homogeneity detection algorithm that searches for a seed or pattern texture for any region that is not central to the scene or does not obfuscate any person, cartoon, object or content, where said seed is the smallest unit of repeating patterns and is allowed to grow accumulating neighboring pixels that follow a similar pattern. Said pattern texture used to test for homogeneity h, of a region r with respect to a seed s is based on texture features, color, and brightness, and may include: quantizing regions to reduce an extent of detail in the image and maps regions of similar intensities to a same bin; Said ranking is determined through suitability of color combination or perceived brightness, computed using color quantization, and where colors in a region are quantized to c color families; c is a tunable parameter, and the content to be inserted is also mapped to its color families; and ranking is based on similarity of color family, with the least rank being given to the closest color family, and the rank is computed using an rgb space for dominant colors as dist r*w1+g*w2+b*w3, where w1+w2+w3=1. Said ranking is determined through calculating a distance to a center of focus, where said center of focus is determined by an analysis of movement in a video sequence and detection of people in the scene, and where, closer a region is to a point of focus, the higher the rank. Each candidate region is ranked based on distance from the center of the image to the candidate region; suitability of color combination or perceived brightness; distance to the center of focus; size of the candidate region for insertion of content; and allocating weightage to said distance from center of image, said suitability of color, said distance to center of focus and said size of the candidate region, and where said weights are user tunable. Said playing back of the video with inserted content may include leading a user to an external link, opening a new browser window or relevant application, pausing the original content for a viewer to return to and resuming playing from where they stopped. Insertion of the content is followed by gamification. Said gamification is associated with scanning a certain number of QR codes or bar codes for a product or points associated with answering a certain number of questions for a leaderboard. Implementations of the described techniques may include hardware, a method or process, or computer software on a computer-accessible medium.

A system also includes input and output device, where said input device is through which a consumer selects a video to be played and said output device is through which processed video with inserted content is played back to the consumer; a controller may include a processing unit and an operating system of the device, with transfer of control from an input/output interface to various processing units for insertion of the content and playback; a video type classifier; a video scene segmentation and selector module, where the input video is cut into scenes based on visual content and setting of the scene; a global context analyzer module that ranks suitability of various candidate content for insertion based on relevance to the video selected; a local context analyzer module that finds the most suitable scene for the insertion of highest of said ranked content, where said local context analyzer takes as input the video type and video scenes from the segmentation and scene selector process, and further may include: a video content analysis submodule for object localization and classification of important object classes and for stitching together a description for the scene or tags associated with the scene; an audio content analysis submodule for audio type and tone classification and generation of a transcript for voiced speech; a text content analysis submodule for analyzing closed captions and/or transcript of voiced speech, if available, for the scene and analyzing related textual content; and a scene relevance ranker submodule that receives output from said video content analysis submodule, said audio content analysis submodule and said audio content analysis submodule to provide a recommendation for the most relevant scenes to insert the various content shortlisted for the video. The system also includes a content and location recommender module that selects the best match between the scene and content, and selects key frames within each scene to analyze for suitability of specific insertion sites, where the selection of a key frame is done based on frame differencing to find one that is most different from its consecutive f' (user-tunable) frames, and selecting the best location for content insertion; a content modifier and video editor module that performs insertion by scaling the content to best span the insertion site shortlisted; a video player that plays the video of the segmented scenes spliced by said video editor to render the video amenable for seamless playback; and a content viewer module where an external link is provided in the content, and if the content may include content to be played for the viewer, a pop up screen presents the content to the consumer. Other embodiments of this aspect include corresponding computer systems, apparatus, and computer programs recorded on one or more computer storage devices, each configured to perform the actions of the methods.

Implementations may include one or more of the following features. The system where processing of said video type classifier is specific to the type of video selected, and may include categorizing the input video as educational, sports, news or entertainment, and if metadata is available, the video is annotated, if metadata is not available, closed captions and video content is used to classify the video using a machine learning model. In case of news and education videos, selection by said video scene segmentation and selector module is based on meta data or transcript of the content being discussed, in case of a sports video, the segmentation is based on sequence of video frames between a change of score or foul call. Said global context analyzer takes as input the video type and video scenes from the segmentation and selector module, may include: a video meta data analyzer module that accesses meta information regarding the video; a user profile analyzer module, may include: user profile analyzer that takes as input user information user's profile; user interests analyzer module that analyzes additional information including browser search history and social media postings; content meta data analyzer that ranks the meta data of the content is again ranked using available consumer information available; and content relevancy ranking module, where relevancy of content from both video-relevance and user-relevance subcomponents are pooled and an overall ranking of the most relevant content is obtained and based on underlying business strategy content for insertion is selected. Insertion by said content modifier and video editor module is performed by one of the following procedures: scaling the content to fit a location site selected, tiling of the content to span a space selected, and alternating between a picture/message and QR code if both cannot be accommodated in the space selected to match size requirements for the content to be visible. Implementations of the described techniques may include hardware, a method or process, or computer software on a computer-accessible medium.

DETAILED DESCRIPTION

Described herein is a method and system to facilitate the insertion of content in streaming or stored video for a more meaningful reach of content to the end user in a way that adds some value and ensures a non-intrusive, more customized content-delivery for a consumer. The content could be in multiple forms: as an image or logo or a banner or a barcode or a QR code, etc., associated with a brand, picture of a product or a hyperlink to relevant, curated content. This is integrated seamlessly with stored or streaming video using an analysis of multiple modalities: meta data, the audio stream, a text file (transcript from the audio or closed captions), audio and visual content that is mapped to the content most likely to be useful for the consumer. Global context for determining the content that is most appropriate for a video begins with meta-data analysis.

Meta-data includes the following.

In case of entertainment: story line or plot of the video, information on the actors, director, etc., involved in the video and endorsements they are associated with, etc., rating or certification associated with the video and viewer age groups, if available and their ratings or reviews, from prior runs.

In case of education video: the topic being covered or subject being discussed with its pre-requisite and related categories in case of educational content, or the grades to which the course is typically offered to or the difficulty level of the course, the presence of formulae etc., based on which numericals are generated, etc.

In case of sport video/taped matches: type of sport, location (venue of the game), time of the game, type of play, teams (or athletes, in case of an individual sport) and specific players involved, etc.

In case of news video: type of program (read by an anchor vs a newsroom debate/interview, etc.), people involved, time, location and topic pertaining to the news, channel or host of the show, etc.

All these details are used to determine age-appropriateness, utility and global context for selecting the most relevant content to be inserted with for a given content of the video.

The actual video is processed to initially obtain a sequence of frames that are viable for insertion—since the content needs to be visible on screen for a minimum length of time. This is achieved through scene segmentation and key scene detection. An adaptive algorithm finds scene segments for contiguous/related content such as a specific setting (an apartment, coffee shop, outdoor location, studio setting, focus on the blackboard or whiteboard or a presentation, etc., in case of still camera scenarios such as with education, news or entertainment video) and a sequence of frames pertaining to a topic or a sequence of contiguous frames associated with a score in a game or a player or a specific scene in case of a moving camera shots, particularly those with slow motion effects or zoomed in version of an action or replays, as with sports video or entertainment (fight scene, etc.) to determine a sequence of video frames that are not action-intensive and serve as viable options for insertion of the additional content or advertisement.

The above scene segmentation is followed by determining the local context through video content analysis. The video content analysis comprises analyzing three modalities of audio, video and textual content.

Exemplary considerations in audio content analysis include: Is this a fight scene? Is this a song? Is this a dialogue? What is the commentator saying? Is the crowd cheering? Is there a sound effect (such as a whistle or a bell, fisticuffs, etc.)? Are there long pauses? These add valuable information to the context and extent to which a user's attention would be on the visual content in that duration.

Exemplary considerations in visual content analysis include: Visual content (who are the actors/characters involved in the scene? What is the setting of the scene? What are the objects detected in the scene? How rapid is the motion on the screen (panning of the camera)?)

Textual content is used to determine what the subject of discussion. A transcript file is generated from the audio or closed captions and subtitles made available with the video. These are used to determine the most appropriate sequence of frames for insertion of additional content that is useful to the user. Having identified what segments in the video are most amenable for the insertion, the location of insertion of the video in the image frame is next addressed below.

The ideal location of the candidate insertion site are patches in a video frame that are relatively unchanging/can serve as insertion sites for the content. Candidate sites are determined through a search procedure that uses a weighted function to determine the relative importance given to the following:

(a) Location (i.e., proximity to the point of focus in the video frame (such as clothing of the start player or on a prominent part of the wall or furniture given a higher weight over an obscure corner of the scene or on a small region such as on a vase to the side, etc.)

(b) Homogeneity of texture for that region (a highly patterned region may be too distracting for a viewer to notice the inserted content over a relatively less patterned canvas)

(c) Size of the region (if the candidate region is too small, the content may not be visible; a large candidate region may allow for the placement of a tiled pattern, etc., of the content or a slightly larger version, so it comes to the notice of the user)

(d) Strength of relevance of the content to be inserted (e) Relative brightness or illumination of the candidate location vis-a-vis the overall scene (f) Contrast provided by the candidate location for the content to be inserted While feedback can be used to adapt the relative importance given to each component, weights are preset to defaults based on supervised learning models trained on a representative set of scenarios.

Next, the content that is most useful to the consumer is determined through mining of the user's profile (comprising personal and professional information) and multiple sources such as:

(a) Explicit feedback from the consumer (b) Periodic surveys (c) Feedback from the company whose content is inserted or the number of hits on the weblinks provided, number of hits on related content, etc.

(d) The following content contingent on consumer's consent: social media postings, browser history, search history, professional network, consumer history on this system (e) Trends extracted from customer segments similar to consumer's background/usage patterns.

Finally, the content is inserted and played to the consumer through video rendering—with the appropriate content inserted seamlessly for the consumer.

Depending on the use case, the rendering may be followed with gamification—such as a discount associated with scanning a certain number of QR codes or bar codes (in case of an advertisement in a sporting, news or entertainment video) or points associated with answering a certain number of questions for a leaderboard (in case of an educational video), etc.

A self-contained system described herein comprises a compilation of all the foregoing components for a for the analysis of different types of video, global and local context analyses through a detailed analysis of multiple modalities, coupled with machine learning based adaption of content to add value to the consumer followed by video rendering with an option for gamification (or keeping track of the QR codes scanned, etc., for offering of discounts on products, etc.) for a seamless integration of content. The specific techniques used for analyzing various components (particularly, homogeneity detection for recommending candidate insertion sites) are disclosed below.

Figure 1:
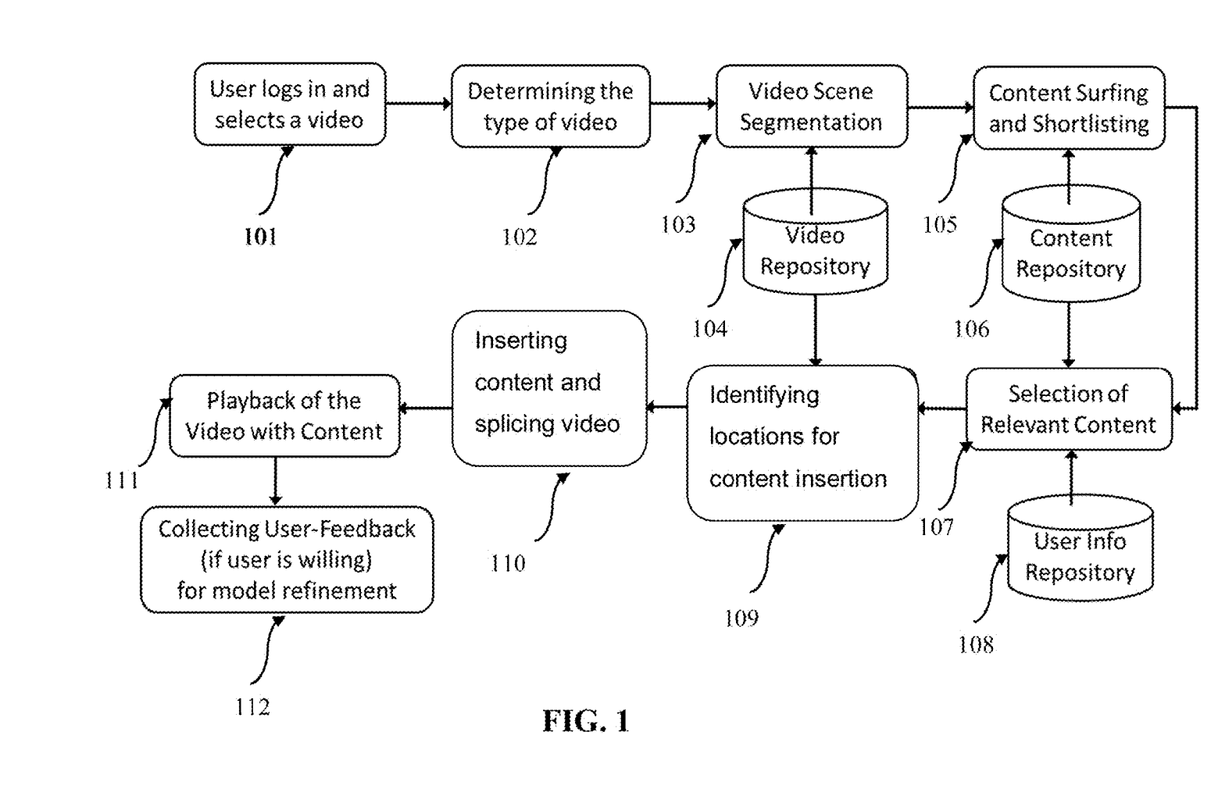
FIG. 1 illustrates the process flow of the entire system from user login to viewing a video with inserted content.

FIG. 1 illustrates the process flow of the entire system from user login to viewing a video 101 with inserted content. The user logs in and selects a video 101. The user login helps identify user-specific information such as the demographic the user belongs to, the user's specific professional and personal interests, etc., for mining of relevant content for insertion. Optionally, the user profile is stored and the user selects the video they would like to view without explicitly logging in. In another embodiment, the user selects to resume viewing a previously selected video within a pre-set duration of the content insertion and rendering. In this case, the rendered content is stored and played back.

The step of determining the type of video 102 involves determining if the video is streaming in real time or is stored content. For streaming video, time-consuming analysis pertaining to meta-data and external data sources is skipped and internal analysis and insertion is performed with a negligible lag with content in real-time. If the video selected is stored, then, a thorough analysis of the content is performed with sufficient buffer for re-composing the video as it plays.

The type of video is also categorized based on content: entertainment video, education, sports or news. Depending on the type of category the video belongs to, the subsequent steps will be appropriately chosen. Likewise, any other information such as whether the show is a single camera or multi-camera show, etc. (The primary discussion will pertain to an entertainment video (movie, sitcom, talk show, etc.) and variations will include other types of video, wherever there is any change in the manner in which the video is processed.)

From the video repository 104, the choice of the viewer's video is selected. This is followed by a video scene segmentation 103 to ferret such contiguous segments that have relatively small change (not intensive activity in the foreground unlike an action-packed and fast-paced fight scene or car chase, etc.) and sufficiently long (in time) segments for the insertion to be noticeable by the viewer and yet not distract them from the main content. These scene segments are found using (i) motion vectors to track changes and (ii) simple differencing to detect change in the illumination (voxel intensities), placement of scene elements, etc. Empirical thresholds are set on these features that can be adjusted based on user-feedback. The scenes segments are indexed based on where in the video they occur and how long the scene lasts.

In case the user's interest stems from wanting to study a certain player (or an actor) and they have a tendency to skip to scenes containing only that player (or actor), the scene segmentation tries to shortlist scenes with a preference for this player (or actor). In case of an educational video, if the user has chosen to use annotations to search for a specific concept, the scenes shortlisted will pertain to the concept or any material directly related to this. In case of a news video, if there is a particular story the consumer is interested in, then scene segments will try to shortlist scenes associated only with that story or the people involved.

This biasing of the shortlisting process allows the customer to see the inserted and rendered content, whether they choose to follow up with visiting the external link or additional content or not.

The Content surfing and shortlisting 105 step is described herein. Once the scenes are segmented, the content repository 106 is surfed to find the most appropriate content for insertion. The appropriateness at this stage is determined through an analysis of the elements of the scene (visual content analysis) in the video, the audio (sound effects, whether there is relative silence or a crowd is cheering, tone of the speaker, etc.) and textual content, if available (a transcript of the audio generated or a closed captions corresponding to the sequence of frames). From these, visual, audio and text content relevant to the topic are analyzed as follows.

The visual content analysis is described herein. A machine learning model is used to delineate visual elements in the video frame—these comprise common elements such as people (the presence/absence of people and silhouettes of people), elements of clothing and accessories like hats, headphones, shades, coat, tie, shoe, purse, suitcase, etc., furniture, classroom or school related objects (books, blackboard, eraser, projection screen, etc.), household objects, home improvement tools, kitchen related implements, weapons, scenery (trees, sky, sun, moon, stars, lake/pond, well, grass, sand, beach, waves/sea, rocks, mountains, snow, etc.), animals, sports related elements (surfboard, tennis racket, ping pong table, volleyball net, badminton court, taekwondo uniform, cricket gear, martial arts gi, dojo mats, baseball gear, running tracks, etc.), buildings, vehicles (cars, bikes, trucks, airplane, ship, etc.) and other common objects like luggage, bottles, phone, television, walls, blinds, curtains, vase, carpet, banister, kite, headphones, etc., along with recognizing any specific shape or color such as a 'white shirt' or 'black tie' or 'red bowtie' or 'blue folder', 'purple triangles on the wall' (wall paper), etc. These visual elements are used to stitch together a caption of the scene and for identifying specific locations (people's faces or prominent objects at the center of focus, etc., are avoided). Visual content for a sequence of frames is also assessed for the extent of motion.

Audio is classified as silence, voiced or unvoiced. If it is voiced speech, then a transcript is generated for further analysis under 'Textual content'. If it is unvoiced data, it is checked for white noise versus a plethora of other sounds such as thunder, clapping, cheering, yelling, coughing, sneezing, hiccups, whistling, background music/orchestra, explosion, hooves, rustling of leaves, creaking of wood, running water, sound of waves, etc. This is also used in adding detail to the setting of the scene or specific action associated with the sequence of frames.

Text is used if closed captions are available. If not, use free and open source speech-to-text machine learning models to obtain a transcript of the audio. This is also used to add detail to the caption generated by the foregoing steps.

The content meta-information (description, etc.) that most closely matches the topic is ordered in descending order of the extent of match.

In case of an educational video, only audio/text modalities are used for determining the content of the video clip; visual elements are not used in the analysis but with Step 6 to ensure the additional material is not placed on the person of the instructor or at a central location in a manner that would obfuscate text, etc., vital to the video selected by the consumer.

The step of selection of relevant (i.e., consumer-adaptive) content 107 is described herein. The top-ranked content for insertion (i.e., the top t % of content for insertion that has closely matched with video content of the previous step), further analysis is done on which of these would be most appropriate to the user in terms of their age and personal and professional interests, past history (if available) on the system, etc. Depending on the level of access the user provides and the extent of detail they provide in their user profile, machine learning models are used to mine patterns and deduce trends—the products they are likely to be interested in either for purchase or to learn more about. A user info repository 108 stores information on the user profile.

Depending on the extent of information available and extent to which a specific consumer can be fit into a customer segment, apply collaborative filtering for their profile (based on the interest in content shown by similar users) to arrive at broad recommendations for the type of content the specific consumer may be interested in.

In case of an educational video, if the user is a beginner, the system is programmed to present questions or numericals that are relatively easy versus content that is more challenging or questions and numericals of a higher difficulty level presented to a consumer whose proficiency is higher or has viewed the video one or more times in the past to aid in their practice or in self-testing their skill level.

If purchase patterns are available, then brands related to an item of purchase are shortlisted.

If there is very little or no personal information of the user or there is no history available for their viewing pattern or preference, then, content is shortlisted based entirely on the relevance to the shortlisted scenes.

The step of identifying a location for content insertion 109 is described herein. Location is determined through further analysis of the image for visual content elements based on:

Lighting: Day (light, bright), night (dark), sepia (yellowish tinge, as is the case with period dramas)

Venue: Indoor bright, indoor dark, indoor multi-hued (artificial light), outdoor (natural light)

Action: Still (less movement)/low activity (conversation, eating, etc., that has some movement but limited, or a voice over with focus on some landscape or still object(s)), medium level of activity—slow movement (walking to a fridge, etc), high level of activity —like a fight scene (camera is still enough for this to be labelled a scene).

Presence of person(s)/subject(s): a prominent person/subject, no 'subject'—landscape, no 'subject'—focus is on object(s), too many subjects (crowd)

Presence of synthetic elements such as cartoons, sketches, puppets or anime figures.

Figure 2:
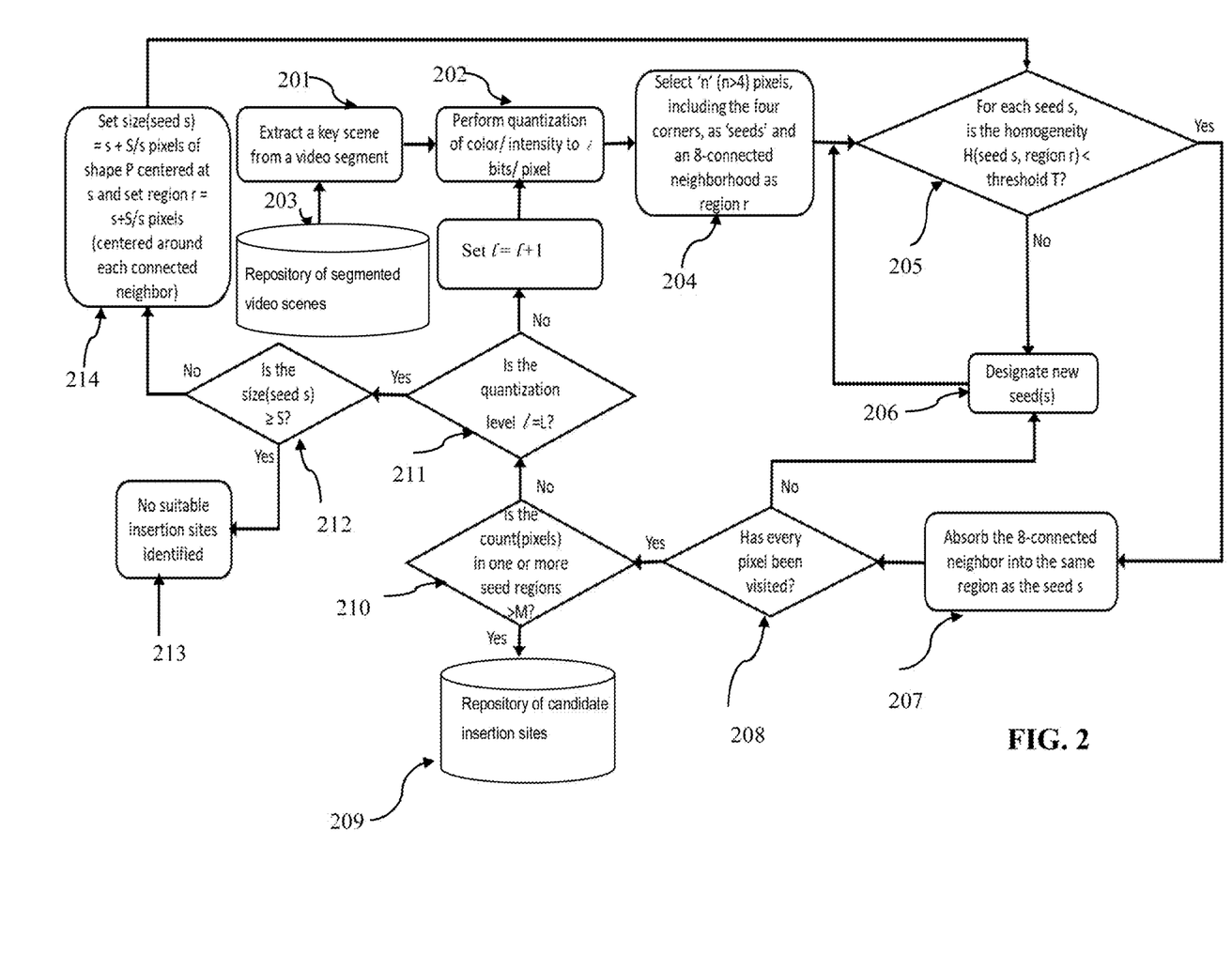
FIG. 2 illustrates the process flow for the detection of candidate insertion sites based on the homogeneity and size of connected components in an image frame.

Next, the presence of movement or subjects in the sequence is identified as points of focus and these regions are not considered viable locations for content-insertion. While content can be inserted anywhere else in the rest of the image, determine the most suitable candidate regions using a homogeneity detection algorithm. The process flow for homogeneity detection is shown below:

FIG. 2 illustrates the process flow for the detection of candidate insertion sites based on the homogeneity and size of connected components in an image frame.

The algorithm searches for a 'seed' texture (or pattern) for any region that is not central to the scene or does not obfuscate any person (or cartoon, etc.) or object or content (as in a slide or blackboard or whiteboard). This seed is the smallest unit of repeating patterns (initially only, a pixel) and is allowed to 'grow' accumulating neighboring pixels that follow the same/similar pattern. The pattern used to test for homogeneity H 205, of the region r with respect to a seed s is based on texture features, color and brightness. The quantization of regions 202 reduced the extent of detail in the image and maps regions of similar intensities to the same bin. Next, initialize 'n' pixels at random to be 'seeds' 204. These seeds grow by looking for similar patterns (when the seed is one pixel, the 'pattern' is only the intensity) in the 3×3 neighborhood of the pixel. Any 8-connected 207 pixel that is in the same 'bin' is marked as the same region. The moment we find a pixel that belongs to a different intensity, we initiate a new seed 206 and look for regions similar in intensity to that. Once every pixel in the image has been visited 208, we check for the sizes of the regions 212 thus formed. The quantization level '1' is initially coarse and with each iteration, it is made finer 211 through increasing the number of bits per pixel, to discern more intricate patterns as the size of the 'seed' increases. If the regions are sufficiently large (in this case, we have used 10% or more than the smallest side of the video frame), stop the process 213. If not, increase the size of the seed (to allow for the computation of more complex textures) 201 and repeat the steps looking for (larger) regions with repeating patterns. Again, once every pixel has been marked as a seed region, we stop to check the size of the regions. If any region is large enough to be considered a candidate region 210, we stop 209. If not, the process is repeated with still larger regions. At the threshold S (a user tunable parameter) 212 we stop growing the seeds and either return the candidate regions, if any or discard the sequence of frames as not being suitable for insertion 213 of the content selected.

The step of inserting content and splicing the video 110 is described herein. Candidate sites for insertion in the previous step are ranked based on their suitability. The rank is based on the following:

Distance from the center of the image to the center of the candidate region (smaller the better)

Suitability of color combination or perceived brightness—This is computed using color quantization. The colors in the region are quantized to C color families; C is a tunable parameter, with over a million different colors that can be tested. The default list comprises the color families for Black, White, Gray, Red, Yellow, Green, Cyan, Blue and Magenta. Likewise, the content to be inserted is also mapped to its color families. We rank based on similarity of color family, with the least rank being given to the closest color family. This is computed using the RGB space for dominant colors as:

Dist $R*w1+G*w2+B*w3$, with weights, $w1+w2+w3=1$ (the weights $w1=0.299$, $w2=0.587$ and $w3=0.114$ are the weights found to be empirically useful, however any combination of weights can be used that are found suitable for the application on hand).

This ensures do not insert content in red over a red background in the scene in a manner that it is barely visible/noticeable by the viewer.

Distance to the center of focus (the 'center of focus' is determined by the analysis of movement in the video sequence and detection of people in the scene). The closer it is to the point of focus, the higher the rank.

The size of the candidate region for insertion—The larger the region, the content can be scaled and inserted or tiled within the region, if required. This is particularly helpful for insertion of messages.

If there are multiple viable candidate regions, regions sharing a border with the edges of the video frame are discarded. Each candidate region is ranked in for each of the foregoing four measures. Finally, a weighted rank is computed. The weights are user-tunable (by default, the highest weight 0.4, is given to the size of the region, 0.3 to perceived brightness, 0.2 to distance from the center of focus and 0.1 to distance from the center of the image). The best locations are presented in decreasing order of preference. By default, the insertion is made in the region recommended as the best. There is no user intervention required, though feedback can be solicited if a user wants to actively engage with the system to help improve the model.

The process of insertion involves scaling the content or tiling the content into the candidate region, based on the size of the region of insertion. A little bit of a background of the region is maintained to allow for seamless integration into the video frame. The region is located in every frame of the sequence of frames associated with the scene and inserted in a similar manner.

Once all the insertions are done for the frame sequence, the video is spliced with the remaining untouched scenes, ensuring the audio and closed captions are in sync—as it was prior to the processing of video frames.

The step of Playback of the video with inserted content 111 is described herein. The media player plays the selected video to the user with playback controls resting with the user.

In case of sports or news or an educational video where the content leads the user to further content, the original content is stored in the background and the requested video is played for the user, with the option of them reverting to the original video they were viewing and resume watching from that point on.

In case of entertainment or any other type of video that leads a user to an external link (through QR codes, etc., for the purchase of a product), a new browser window or the relevant application opens up, pausing the original content for the viewer to return to and resume playing from where they stopped. Scanning of a pre-designated number of QR codes is kept track of for offering a discount or an offer on one or more products.

A detailed object detection scheme also allows the insertion of logos on articles of clothing or accessories of protagonists in the video frame or the replacement of an object, such as a drink on a table with another that belongs to a specific brand, etc.

The step of collecting user-feedback 112 (if the user is willing) for model refinement is described herein. The adjustment of weights (importance given to different aspects assessed) for ranking candidate insertion sites as well as the size of the content inserted and a feedback on the relevance of the content inserted are solicited from the user if they are willing to engage with the system and improve this. This is a default option that is presented to the user at the end of their viewing experience.

Figure 3:
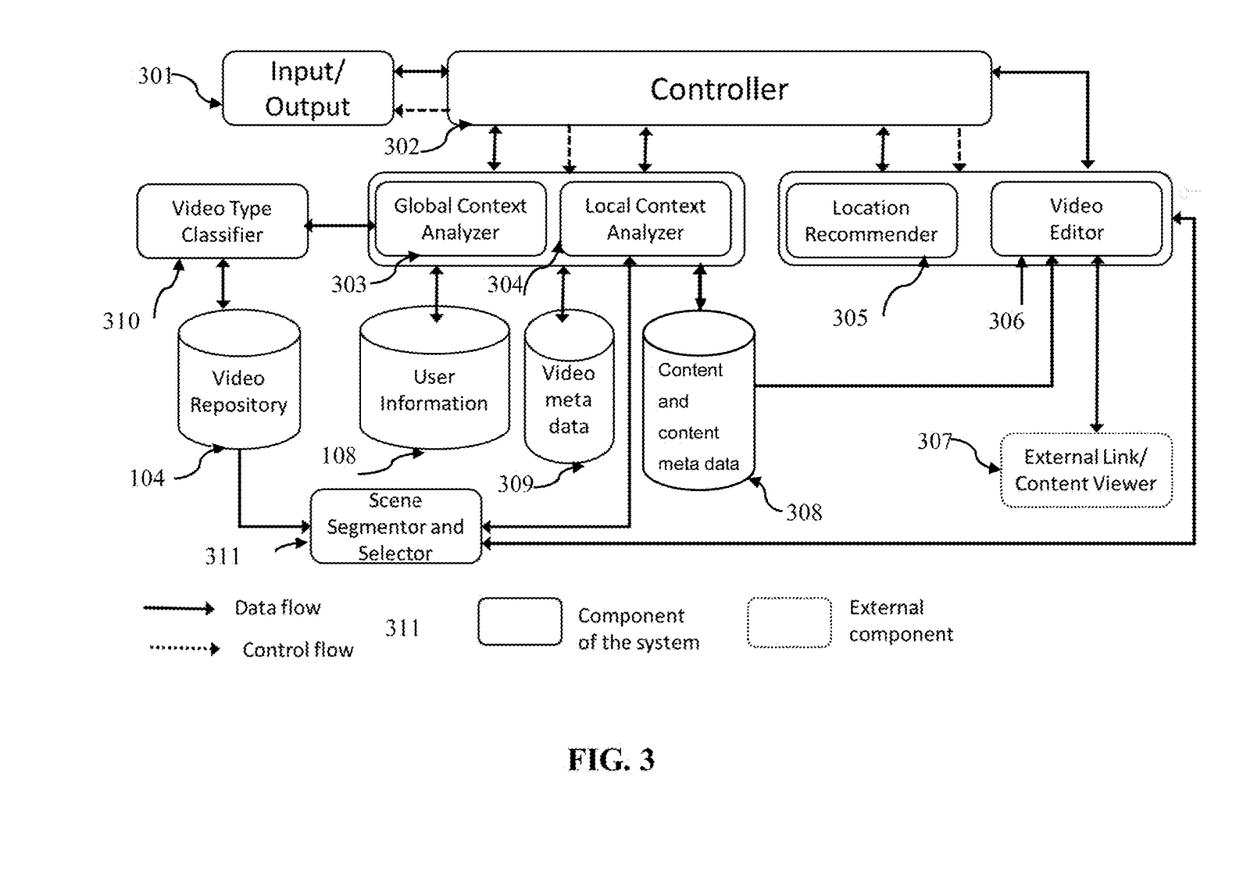
FIG. 3 illustrates the overall system architecture delineating various components of the system.

FIG. 3 illustrates the overall system architecture delineating various components of the system.

The Input/Output device 301 is described herein. The input device comprises of a touch screen device or a keyboard through which a consumer selects a video to be played and output device is a touchscreen or monitor through which the processed video (with inserted content) is played back.

The controller 302 comprises the processing unit and 'operating system' of the device, with transfer of control from the input/output interface to the various processing units for insertion of the content and playback.

The video type classifier is described herein. Since the processing is specific to the type of video selected, the first step comprises categorizing the input video as educational, sports, news or entertainment. If metadata is available, the video is annotated. If it is not available, the closed captions (or description of the plot) and video content is used to classify the video using a machine learning model.

The Video Scene Segmentation and Selector 311 is described herein. The input video is cut into scenes based on the visual content and setting of the scene (in case of news and education videos, this is based on the meta data or transcript of the content being discussed, in case of a sports video, the segmentation is based on sequence of video frames between the change of score or foul call—based on an analysis of the score if displayed and/or a transcript of the audio commentary). Once the video is segmented into 'scenes', the selector 311 simply flags viable candidate scenes for insertion. A candidate scene is one in which the movement (i.e., change of visual elements) is minimal (the content remains the same for 'm' frames (user-tunable)) and lasts for a prespecified duration 't' (user-tunable) or longer for the inserted content to be noticed by the consumer. All the scenes in the movie are ranked in the decreasing order of their viability as candidate scenes for content insertion.

The context analyzer, and global context analyzer 303 (meta data) is described herein. Global context analyzer 303 comprises multiple components that ranks the suitability of various candidate content for insertion based on relevance to the video selected.

Figure 4:
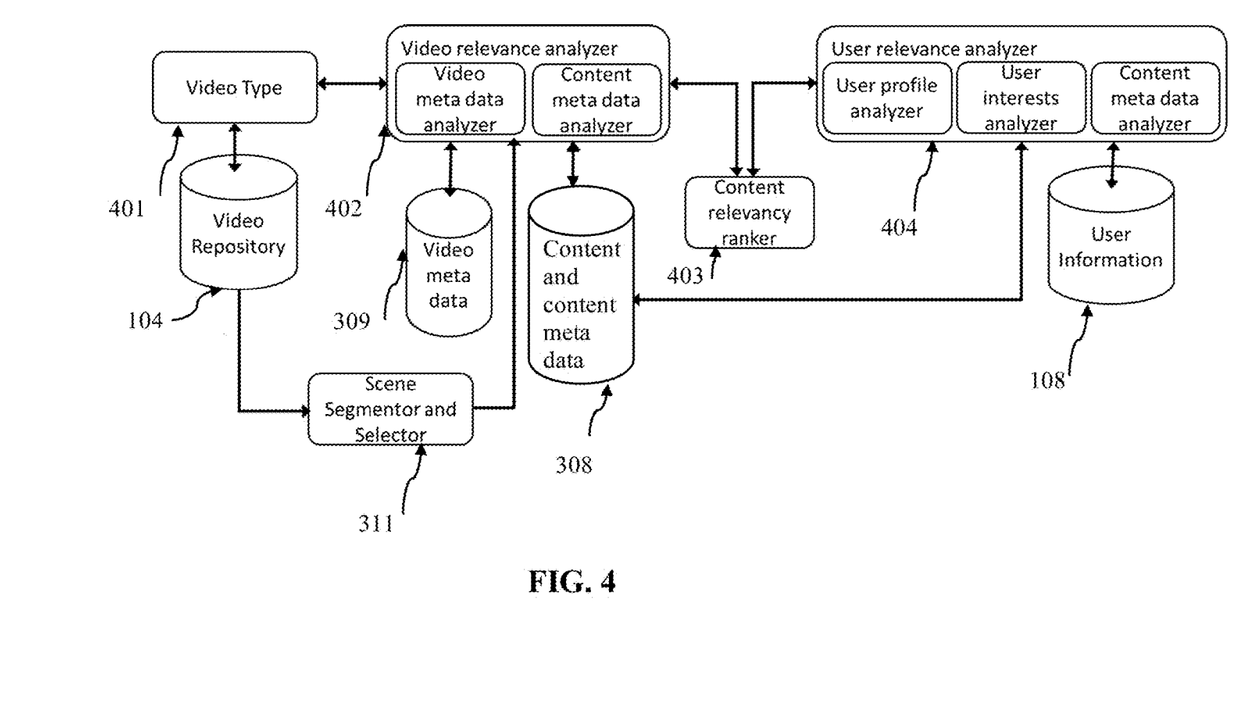
FIG. 4 illustrates the components of the global context analyzer.

FIG. 4 illustrates the components of the global context analyzer.

The Global Context Analyzer 303 takes as input the video type and video scenes from the segmentation and selector.

The video relevance analyzer has two sub-components, video data analyzer and content meta data analyzer 402.

Video meta data analyzer 402—Access meta information regarding the video 309 such as the plot or content (topic being discussed, type of sport), etc., of the video, the actors (or players or professors, etc.) involved, meta data regarding the actors, etc. (such as brand endorsements associated with the actors), reviews from past viewings or feedback available on Rotten Tomatoes, IMBD, etc., websites, viewer age demographic (for narrowing down the age-appropriateness of content to be inserted), etc., statistics are retrieved.

Content meta data analyzer 402—Content is ranked based on the relevance of the content to the video; this is done through matching any information on the meta data that is available (such as what the brand stands for in case of an advertisement, the type of product, etc., or the difficulty level of questions in case of educational video content.

For news video, the date and relatedness of past news are analyzed in the form text.

In case of sports video, the venue, teams/players involved, name of the tournament, etc., details are analyzed to rank the content to be inserted in the decreasing order of their relevance.

User-profile analyzer has three sub components: user profiler analyzer, user interests analyzer and content meta data analyzer 402.

The user-profile analyzer takes as input user information such as the user's profile (whatever details have been shared by the user regarding their age, personal and/or professional interests, age group, etc.). The user interests analyzer uses any additional accessible information (per the user's permission) such as browser search history, social media postings, etc., along with history of usage of this very system (nature of videos viewed, most recently viewed video, the type of videos viewed repeatedly, feedback on content inserted, if the user has engaged with the system and provided any in the past, etc., are analyzed. The content meta data analyzer 402 analyzes and ranks the meta data (description) of the content using the user information available.

The content-relevancy ranker 403 is described herein. The relevancy of content from both the video-relevance and user-relevance subcomponents 404 are pooled and an overall ranking of the most relevant content is obtained. Based on the underlying business strategy (for how much content and the duration for which the content needs to be shared), content for insertion is selected at this stage.

The local context analyzer 304 is the component that finds the most suitable scene for the insertion of the top ranked content from Step 5 above. A block diagram of the sub-components of the local context analyzer is presented in FIG. 6.

Figure 5:
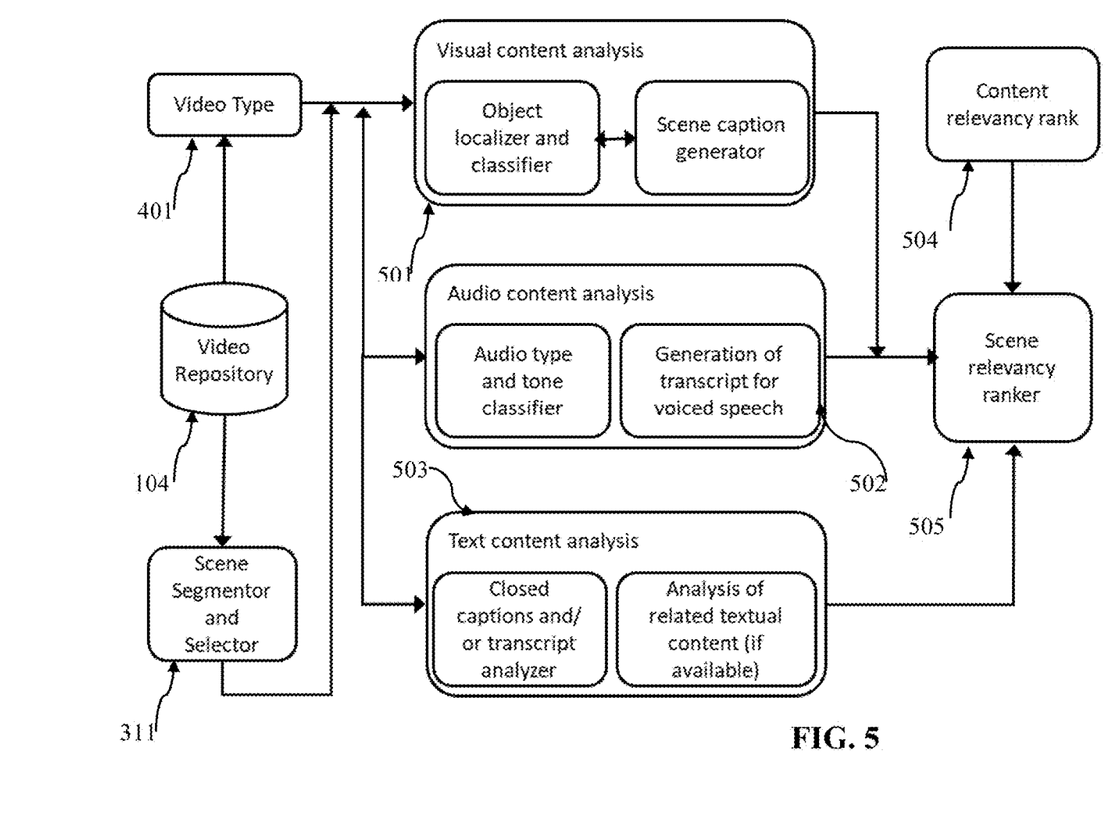
FIG. 5 illustrates the components of the local context analyzer.

FIG. 5 illustrates the components of the local context analyzer 304.

The local context analyzer 304 takes as input the video type and video scenes from the segmentation and scene selector 311 process, and further conducts video, audio and text content analysis.

Video content analysis 501 comprises object localization and classification for important object classes (described under Step 4 of Process Flow) and stitches together a description for the scene or tags associated with the scene.

Audio content analysis 502 comprises audio type and tone classification and generation of a transcript for voiced speech.

Text content analysis 503 comprises analyzing the closed captions and/or transcript of voiced speech, if available, for the scene. It also analyzes related textual content (such as accompanying notes for a topic in case of an educational video, analysis of related commentary on the shot or player for sports video, analysis of related news in print for news video, etc.).

The input from the foregoing three components along with the content relevance rank 504 from the global context analyzer 303 are input to a scene relevancy ranker 505 that provides a recommendation (in descending order) for the most relevant scenes to insert the various content shortlisted for the video.

The location recommender 305 selects the best match between the scene and content and selects key frames within each scene to analyze for suitability of specific insertion sites. The selection of a key frame is done based on frame differencing to find one that is most different from its consecutive 'f' (user-tunable) frames. Alternatively, one in every 'p' frames is processed, based on the frame-rate and extent of movement in the scene. The video frame is then assessed for various parameters. This is followed by running the homogeneity detection algorithm to rank the most suitable sites. By default the best location is selected (this can be modified to allow the top 'q' sites for insertion).

The Content modifier—Video editor 306, is described herein. The actual insertion is done by scaling the content to best span the insertion site shortlisted. There are three options for this:

Insertion of the content by scaling it to fit the location site selected.

Tiling of the content to span the space selected.

Alternating between a picture/message and QR code (in the event both cannot be accommodated in the space selected to match the size requirements for the content to be visible)

The Video player (Input/Output)—The video editor 306 splices the segmented scenes to render the video amenable for seemless playback. In case only a portion of the video has been edited, the video is played as is to that point, followed by the edited scenes and once again the original video is played back. This avoids unnecessary overheads in splicing and rendering the video whole.

External link/content viewer 307 (includes feedback) is described herein. The external link 307 is provided in the content. If the content comprises content to be played for the viewer, a pop up screen presents the content to the consumer.

Any number of such pop up screens can be opened up. But the base video will remain and the consumer can return to this at any point and resume playing the video. There is also a 'feedback' option for the consumer to engage with the system for every instance of insertion. This feedback helps fine tune the system in general and better cater to the specific consumer's interests.

Apart from inserting different types of content into different types of video, a subset of the components of this invention can be used to insert content to images. For example: For celebrities to use their images (on Instagram, etc.), to advertise products or social causes they are partnered with or for athletes to use still shots from past games to advertise products or brands they are partnered with, etc.

A subset of the components of this invention can also be used to insert content into text. For example: course instructors can use the method described to insert hyperlinks to related content in external sites, those blogging recipes or home improvement projects, etc., can insert hyperlinks to sites where the relevant ingredients or implements can be purchased, etc.

Described herein are examples of the application of the invention. The following are examples from the perspective of an end-user:

A kindergarten student or a language learner ('consumer') is learning a rhyme that teaches numbers or shapes or colors. As the rhyme repeats, relevant elements (such as the specific number or shape or color) can be inserted and the consumer asked to click on as many relevant elements as they notice to facilitate active learning and update a leaderboard either for the individual user or within a user-group such as a class.

A child is watching a cartoon show; toys or stationery associated with the cartoon are advertised in the form of small images or animations with hyperlinks to help parents learn more about these or order them online.

A learner is trying to understand some concept of accounting. As the lecture video plays, a hyperlink to exercise problems can be presented to let the user exit the video temporarily, test their understanding of the concept and return to the video and continue to watch the content, facilitating active learning.

A consumer is watching their favorite cooking show. A food delivery application or a grocery chain in the wants to remind users to order from them. Logos and QR codes can be seamlessly integrated into the video and a discount provided if a certain number of QR codes are scanned by the consumer.

A consumer is watching a humorous sit com; a stand-up comedy show is advertised through a banner and QR code to book a ticket for the show on the coffee table at the center of the video frame.

A consumer is watching a movie and a new product endorsed by the lead actor must be advertised. These can be seamlessly integrated in scenes with the lead actor with a small banner and logo with a hyperlink to the product information, if the user is keen to look into the product. The insertion is made at multiple points in the movie so, if nothing, the consumer associates the new product with the actor and may look it up some other time.

A sports aficionado is watching a game. A sugar-free nutrition bar is advertised at the center of the field/on the players' clothing when the players are standing around, waiting for the referee to make a call, (or one of the players to take a free throw or a free kick), etc.

An athlete is watching a game; a new sports shoe is advertised near the score board without obfuscating the view of the field.

A working professional is watching the evening news. A new phone plan is introduced through a banner on the news editor's desk.

A professional who had traveled is watching the news; a small banner provides thumbnails for relevant stories in the past few days leading up to the present news.

The following are examples of the application of the invention from the perspective of an advertiser or content creator.

A company provides information of the product to be advertised and an image or banner or QR code or logo associated with the brand along with meta information of what the product is about, if any celebrity is associated with the product and if they are willing to extend any offers (such as discounts) to consumers who solicit information about the product or the product itself through the system. With minimal effort the company is able to reach out to an audience for whom the product is relevant.

The content creator wants information to be available to students in a manner that would best serve their needs and facilitate active learning. By providing a video recording and associated content (such as multiple choice questions or practice problems), apart from making this explicitly available on the course page, the content can be intelligently embedded for the learner to use as practice or as feedback for the course instructor on the extent to which a learner has understood concepts discussed in that part of the video.

The following is an example of the application of the invention from the perspective of video content owners/streaming services. Subscription rates are meant to preclude insertion of video advertisements. However, content can be further monetized through the insertion of non-intrusive content in videos.

Figure 6:
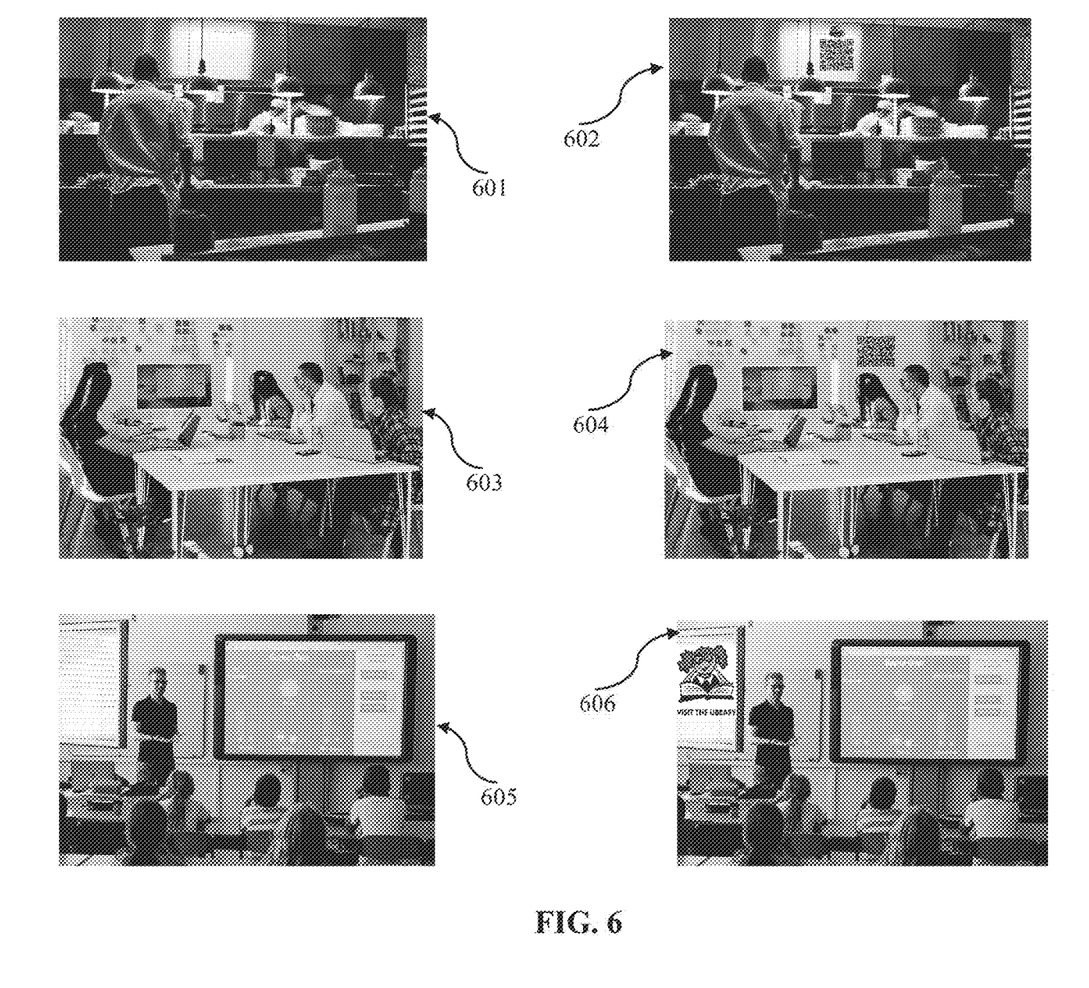
FIG. 6 illustrate examples of still image versions of video segments before and after insertion of content.

FIG. 6 illustrate examples (still image versions of video segments) before and after insertion of content. Images 601, 603 and 605 present the original scene and images 602, 604 and 606 present the scene after content has been incorporated.

FIG. 6, image 601 exemplarily illustrates a scene without content insertion, and FIG. 6, image 602 exemplarily illustrates the scene with an inserted QR code for a burger place.

FIG. 6, image 603 exemplarily illustrates an office presentation, and FIG. 6, image 604 exemplarily illustrates the office scene with a QR code for purchase of sticky notes.

FIG. 6, image 605 exemplarily illustrates a classroom scene, and FIG. 6, image 606 exemplarily illustrates the classroom scene with the insertion of an image with a message banner.

These are examples of insertion of content in scenes with limited homogenous regions in a scene with dark lighting (FIG. 7a) and (FIG. 7b), bright setting (FIG. 7c) and (FIG. 7d) a scene in which the focus is off-center and an scene in which the focus is at the center and takes up most of the scene (FIG. 7e) and (FIG. 7f) (with the course instructor and presentation content) taking up more than 70% of the real estate of the video frame.

What is claimed is:

1. A computer implemented method for automated, context sensitive and non-intrusive insertion of consumer-adaptive content in a video presented to a user, comprising:
    logging in said user and identifying specific professional and personal interests of the user;
    determining a type of said video wherein the video is determined to be one of a streaming or a stored video;
    conducting scene segmentation of the video;
    surfing a content repository, and shortlisting appropriate content through analysis of elements of the scene in the video, audio, and textual contents;
    determining top-ranked content for insertion based on what is appropriate to the user in terms of their interests;
    identifying locations for content insertion through further analysis of an image for visual content elements based on one or a combination of lighting, venue, action, presence of person(s) or subject(s), and presence of synthetic elements;
    ranking said identified locations for insertion based on suitability;
    inserting content into the identified location and splicing the video; and
    playing back the video to the user with said inserted content.

2. The method of claim 1, wherein location for content insertion is determined through a homogeneity detection algorithm that searches for a seed or pattern texture for any region that is not central to the scene or does not obfuscate any person, cartoon, object or content, wherein said seed is the smallest unit of repeating patterns and is allowed to grow accumulating neighboring pixels that follow a similar pattern.

3. The method of claim 2, wherein said pattern texture used to test for homogeneity H, of a region r with respect to a seed s is based on texture features, color, and brightness, and comprises:
    quantizing regions to reduce an extent of detail in the image and maps regions of similar intensities to a same bin;
    initializing 'n' pixels at random to be 'seeds', wherein said seeds grow by identifying similar patterns in the 3×3 neighborhood of the pixel, and wherein any 8-connected pixel that is in the same bin is marked as the same region, and wherein if a pixel is found that belongs to a different intensity, initiate a new seed and look for regions similar in intensity to that of said new seed;
    visiting all pixels in the image for classification of seeds, and calculating the size of the seed regions, wherein if the size of said region is more than a predetermined percentage, stop the process, else increase the size of the seed and reduce the extent of quantization to identify regions with repeating patterns with said seed size increased, wherein a growth of the seed is based on a predefined shape; and
    stopping the asynchronous growth of the seeds at a predefined threshold size S, and either returning the suitable candidate regions for insertion of content, if any, or discarding the sequence of frames as not being suitable for insertion of the content selected.

4. The method of claim 1, wherein said ranking is determined through suitability of color combination or perceived brightness, computed using color quantization, and wherein colors in a region are quantized to C color families; C is a tunable parameter, and the content to be inserted is also mapped to its color families; and ranking is based on similarity of color family, with the least rank being given to the closest color family, and the rank is computed using an RGB space for dominant colors as Dist $R*w1+G*w2+B*w3$, wherein $w1+w2+w3=1$.

5. The method of claim 1, wherein said ranking is determined through calculating a distance to a center of focus, wherein said center of focus is determined by an analysis of movement in a video sequence and detection of people in the scene, and wherein, closer a region is to a point of focus, the higher the rank.

6. The method of claim 1, wherein each candidate region is ranked based on
   distance from the center of the image to the candidate region;
   suitability of color combination or perceived brightness;
   distance to the center of focus;
   size of the candidate region for insertion of content; and
   allocating weightage to said distance from center of image, said suitability of color, said distance to center of focus and said size of the candidate region, and wherein said weights are user tunable.

7. The method of claim 1, wherein said playing back of the video with inserted content comprises leading a user to an external link, opening a new browser window or relevant application, pausing the original content for a viewer to return to and resuming playing from where they stopped.

8. The method of claim 1, wherein insertion of the content is followed by gamification.

9. The method of claim 8, wherein said gamification is associated with scanning a certain number of QR codes or bar codes for a product or points associated with answering a certain number of questions for a leaderboard.

10. A system for automated, context sensitive and non-intrusive insertion of consumer-adaptive content in a video presented to a consumer, comprising:
   input and output device, wherein said input device is through which a consumer selects a video to be played and said output device is through which processed video with inserted content is played back to the consumer;
   a controller comprising a processing unit and an operating system of the device, with transfer of control from an input/output interface to various processing units for insertion of the content and playback;
   a video type classifier;
   a video scene segmentation and selector module, wherein the input video is cut into scenes based on visual content and setting of the scene;
   a global context analyzer module that ranks suitability of various candidate content for insertion based on relevance to the video selected;
   a local context analyzer module that finds the most suitable scene for the insertion of highest of said ranked content, wherein said local context analyzer takes as input the video type and video scenes from the segmentation and scene selector process, and further comprises:
      a video content analysis submodule for object localization and classification of important object classes and for stitching together a description for the scene or tags associated with the scene;
      an audio content analysis submodule for audio type and tone classification and generation of a transcript for voiced speech;
      a text content analysis submodule for analyzing closed captions and/or transcript of voiced speech, if available, for the scene and analyzing related textual content; and
      a scene relevance ranker submodule that receives output from said video content analysis submodule, said audio content analysis submodule and said audio content analysis submodule to provide a recommendation for the most relevant scenes to insert the various content shortlisted for the video;
   a content and location recommender module that selects the best match between the scene and content, and selects key frames within each scene to analyze for suitability of specific insertion sites, wherein the selection of a key frame is done based on frame differencing to find one that is most different from its consecutive 'f' (user-tunable) frames, and selecting the best location for content insertion;
   a content modifier and video editor module that performs insertion by scaling the content to best span the insertion site shortlisted;
   a video player that plays the video of the segmented scenes spliced by said video editor to render the video amenable for seamless playback; and
   a content viewer module wherein an external link is provided in the content, and if the content comprises content to be played for the viewer, a pop up screen presents the content to the consumer.

11. The system of claim 10 wherein processing of said video type classifier is specific to the type of video selected, and comprises categorizing the input video as educational, sports, news or entertainment, and if metadata is available, the video is annotated, if metadata is not available, closed captions and video content is used to classify the video using a machine learning model.

12. The system of claim 10, wherein in case of news and education videos, selection by said video scene segmentation and selector module is based on meta data or transcript of the content being discussed, in case of a sports video, the segmentation is based on sequence of video frames between a change of score or foul call.

13. The system of claim 10, wherein said global context analyzer takes as input the video type and video scenes from the segmentation and selector module, further comprising:
   a video meta data analyzer module that accesses meta information regarding the video;
   a user profile analyzer module, further comprising:
      a user profile analyzer that takes as input user information user's profile;
      a user interests analyzer module that analyzes additional information including browser search history and social media postings;
      a content meta data analyzer that ranks the meta data of the content is again ranked using available consumer information available; and
      a content relevancy ranking module, wherein relevancy of content from both video-relevance and user-relevance subcomponents are pooled and an overall ranking of the most relevant content is obtained and based on underlying business strategy content for insertion is selected.

14. The system of claim 10, wherein insertion by said content modifier and video editor module is performed by one of the following procedures: scaling the content to fit a location site selected, tiling of the content to span a space selected, and alternating between a picture/message and QR code if both cannot be accommodated in the space selected to match size requirements for the content to be visible.

15. The system of claim 10, wherein said content viewer module provides a feedback option for the consumer to engage with the system for every instance of insertion.

* * * * *